United States Patent
Hosoya et al.

(10) Patent No.: US 10,153,485 B2
(45) Date of Patent: Dec. 11, 2018

(54) POSITIVE ELECTRODE ACTIVE MATERIAL AND NON-AQUEOUS ELECTROLYTE SECONDARY BATTERY CONTAINING THE SAME

(75) Inventors: Yosuke Hosoya, Fukushima (JP); Yoshikatsu Yamamoto, Fukushima (JP)

(73) Assignee: MURATA MANUFACTURING CO., LTD. (JP)

( * ) Notice: Subject to any disclaimer, the term of this patent is extended or adjusted under 35 U.S.C. 154(b) by 1500 days.

(21) Appl. No.: 10/821,323

(22) Filed: Apr. 9, 2004

(65) Prior Publication Data

US 2004/0201948 A1    Oct. 14, 2004

(30) Foreign Application Priority Data

Apr. 11, 2003 (JP) ................ P2003-107509

(51) Int. Cl.
*H01M 4/48* (2010.01)
*H01M 4/485* (2010.01)
(Continued)

(52) U.S. Cl.
CPC .......... *H01M 4/485* (2013.01); *H01M 4/131* (2013.01); *H01M 4/366* (2013.01); *H01M 4/525* (2013.01); *H01M 10/0525* (2013.01); *H01M 4/133* (2013.01); *H01M 4/505* (2013.01); *H01M 10/0587* (2013.01); *H01M 2004/021* (2013.01)

(58) Field of Classification Search
CPC .... H01M 4/131; H01M 4/1391; H01M 4/362; H01M 4/364; H01M 4/366; H01M 4/485; H01M 4/52; H01M 4/525; H01M 200/028
See application file for complete search history.

(56) References Cited

U.S. PATENT DOCUMENTS 6,007,947 A * 12/1999 Mayer ................. H01M 4/131
                                                  429/223
6,749,965 B1 * 6/2004 Kweon et al. ............ 429/231.1
(Continued)

FOREIGN PATENT DOCUMENTS

JP    H02-265167    10/1990
JP    H07-192721    7/1995
(Continued)

OTHER PUBLICATIONS

Ohzuku et al. "Zero-Strain Insertion MAterial of Li[Li1/3Ti5/3]O4 for Rechargeable Lithium Cells." 1995, J. Electrochem. Soc., vol. 142 No. 5 p. 1431-1435. (Year: 1995).*
(Continued)

*Primary Examiner* — Alix E Eggerding

(74) *Attorney, Agent, or Firm* — Sheridan Ross P.C.

(57) ABSTRACT

A positive electrode active material includes particles composed of a compound oxide; and coating layers composed of a compound oxide formed on at least parts of the surfaces of the particles. The particles have a layered structure and include a first compound oxide mainly composed of lithium and nickel. The coating layers include a second compound oxide mainly composed of lithium and titanium. The ratio by weight of the first compound oxide to the second compound oxide is between 96:4 and 65:35. The positive electrode active material has a mean particle diameter of 5 to 20 μm.

3 Claims, 3 Drawing Sheets

(51) Int. Cl.
  *H01M 4/131* (2010.01)
  *H01M 4/36* (2006.01)
  *H01M 4/525* (2010.01)
  *H01M 10/0525* (2010.01)
  *H01M 4/133* (2010.01)
  *H01M 4/505* (2010.01)
  *H01M 10/0587* (2010.01)
  *H01M 4/02* (2006.01)

(56) References Cited

U.S. PATENT DOCUMENTS

| | | | |
|---|---|---|---|
| 6,893,776 B2* | 5/2005 | Naruoka et al. | 429/231.3 |
| 6,902,850 B2* | 6/2005 | Wariishi et al. | 429/317 |
| 2001/0031401 A1* | 10/2001 | Yamawaki et al. | 429/231.1 |
| 2001/0046628 A1* | 11/2001 | Oesten et al. | 429/231.1 |
| 2002/0076612 A1* | 6/2002 | Tanizaki et al. | 429/223 |
| 2002/0182502 A1* | 12/2002 | Park | C01G 45/1242 429/231.1 |
| 2003/0017104 A1* | 1/2003 | Spitler et al. | 423/598 |
| 2003/0082448 A1* | 5/2003 | Cho | H01M 4/131 429/218.1 |
| 2003/0124424 A1* | 7/2003 | Takahashi et al. | 429/231.1 |
| 2003/0152839 A1* | 8/2003 | Kawai et al. | 429/329 |
| 2003/0180615 A1* | 9/2003 | Johnson et al. | 429/231.1 |
| 2003/0228519 A1* | 12/2003 | Nakura et al. | 429/223 |
| 2004/0197657 A1* | 10/2004 | Spitler et al. | 429/231.1 |

FOREIGN PATENT DOCUMENTS

| | | | |
|---|---|---|---|
| JP | H07-235292 | 9/1995 | |
| JP | H08-37007 | 2/1996 | |
| JP | H08-102332 | 4/1996 | |
| JP | H08-162114 | 6/1996 | |
| JP | H10-302768 | 11/1998 | |
| JP | H11-067209 | 3/1999 | |
| JP | 2000-149950 | 5/2000 | |
| JP | 2001-035492 | 2/2001 | |
| JP | 2001-256979 | 9/2001 | |
| JP | 2001-313034 | 11/2001 | |
| JP | 2002-063901 | 2/2002 | |
| JP | 2002-075368 | * 3/2002 | |
| JP | 2004-253305 | 9/2004 | |
| WO | WO 97/49136 | * 12/1997 | H01M 4/48 |
| WO | WO 99/03784 | 1/1999 | |

OTHER PUBLICATIONS

Haetge et al., "Ordered Large-Pore Mesoporous $Li_4Ti_5O_{12}$ Spinel Thin Film Electrodes with Nanocrystalline Framework for High Rate Rechargeable Lithium Batteries: Relationships among Charge Storage, Electrical Conductivity, and Nanoscale Structure", Chem. Mater. 23, 19, 4384-4396 (Year: 2011).*

* cited by examiner

POSITIVE ELECTRODE ACTIVE MATERIAL AND NON-AQUEOUS ELECTROLYTE SECONDARY BATTERY CONTAINING THE SAME

CROSS-REFERENCE TO RELATED APPLICATIONS

This application is based upon and claims the benefit of priority of Japanese Patent Application No. 2003-107509 filed Apr. 11, 2003. The entire contents of which are incorporated herein by reference.

BACKGROUND OF THE INVENTION

1. Field of the Invention

The present invention relates to a positive electrode active material including a compound oxide mainly composed of lithium and nickel, a non-aqueous electrolyte secondary battery containing the positive electrode active material, and in particular, to the technology to improve the high temperature property of the non-aqueous electrolyte secondary battery containing the positive electrode active material.

2. Description of the Related Art

Many kinds of portable electronic equipment such as camcorders, cell phones, and laptop computers have been developed in recent years and the demand has been rapidly increasing. As the reduction in size and in weight of the electronic equipment progresses, intensive research and development for improving the energy density of a battery, i.e. the portable power supply, in particular, a second battery have been done. In particular, the demand for a secondary lithium ion battery has been increasing in which doping and undoping of lithium ions are employed. The reason is that the energy density of the secondary lithium ion battery is larger than that of known aqueous electrolyte secondary batteries such as a lead battery, a nickel-cadmium battery, and a nickel-hydrogen battery. In addition, the improvement in the environmental resistance of the secondary lithium ion battery is also expected in order to expand the field of application.

Examples of the positive electrode active material practically used for the lithium ion battery include lithium cobalt oxide and lithium nickel oxide both of which have a layered rock-salt structure, and lithium manganese oxide that has a spinel structure. Each oxide has advantages and disadvantages. Lithium cobalt oxide is widely used currently because the oxide particularly has the superior balance of, for example, capacity, cost, and thermal stability. On the other hand, lithium manganese oxide has a small capacity, and is slightly inferior in high temperature storage property. Lithium nickel oxide is slightly inferior in the stability of the crystal structure, and has some disadvantages in the cycle durability and in the environmental resistance, in particular, in the high temperature property. However, since lithium manganese oxide and lithium nickel oxide have advantages in the material price and in the stability of the supply compared with lithium cobalt oxide, lithium manganese oxide and lithium nickel oxide are more of a promising material and have been studied.

In order to improve the cyclic durability of the lithium nickel oxide, disclosed methods include a method in which the nickel is partly replaced with another element (see, for example, Japanese Unexamined Patent Application Publication Nos. H08-37007 and 2001-35492), a method in which, for example, a certain metal salt is added (see, for example, Japanese Unexamined Patent Application Publication No. H07-192721), and a method in which a specific binder is used in the positive electrode mixture (see, for example, Japanese Unexamined Patent Application Publication No. H10-302768). However, according to the research by the present inventors, in the methods disclosed in the above patent documents, the environmental resistance, in particular, the high temperature property was not sufficiently improved.

Furthermore, in order to improve the characteristics of the positive electrode active material including lithium nickel oxide, a method in which the surfaces of the positive electrode active material are coated with a conductive material or other layered oxide is disclosed (see, for example, Japanese Unexamined Patent Application Publication Nos. H07-235292, H11-67209, and 2000-149950). Unfortunately, in the methods disclosed in the above patent documents, the coating on the positive electrode active material was not uniform, and a large amount of the coating must be required in order to efficiently improve the characteristics. Since these phenomena decrease the capacity of the battery, it is difficult to apply the above methods to a battery having a high capacity.

In addition, a method in which a metal or a metal oxide both of which barely decompose a non-aqueous electrolytic solution is dispersed and is held on the surfaces of the positive electrode active material is also disclosed (see, for example, Japanese Unexamined Patent Application Publication No. H08-102332). However, the metal or the metal oxide disclosed in the above patent document had a significantly low conductivity of lithium ions. Consequently, the metal or the metal oxide on the surfaces of the positive electrode active material prevented lithium ions from doping and undoping in the positive electrode active material. The non-aqueous electrolyte secondary battery using this positive electrode active material had an insufficient performance in the practical use. In addition, the disclosed amount of the metal or the metal oxide used for the dispersion did not have a sufficient effect.

Furthermore, a method in which a surface layer containing titanium (Ti) is formed on the surfaces of the positive electrode active material is disclosed (see, for example, Japanese Unexamined Patent Application Publication Nos. 2002-63901 and 2001-256979). However, according to the methods, the presence of lithium on the surface layer is not considered and the amount of the coating disclosed in Japanese Unexamined Patent Application Publication No. 2002-63901 could not sufficiently improve the characteristic in an operation at a high temperature.

In addition, disclosed positive electrode active materials include a positive electrode active material produced by coating particles of lithium compound oxide with a layer composed of an alkali metal compound or a metal oxide (see, for example, Japanese Unexamined Patent Application Publication No. 2001-313034), a positive electrode active material produced by forming a layer composed of a compound oxide of lithium and a transition metal on the surfaces of particles of lithium compound oxide (see, for example, Japanese Unexamined Patent Application Publication No. H08-162114), and a non-aqueous electrolyte secondary battery including a positive electrode active material having lithium cobalt oxides and a lithium oxide compound such as $LiTi_2O_4$ (see, for example, Japanese Patent No. 2797390). For example, according to the art disclosed in Japanese Unexamined Patent Application Publication No. 2001-313034, the coating layer is composed of a mixture including an alkali metal compound and a metal oxide. Therefore, this method is different from the art using a compound oxide. According to the art disclosed in Japanese Unexamined Patent Application Publication No. H08-162114, the combination of elements in the particles and the coating layer is not specifically considered. According to the art disclosed in Japanese Patent No. 2797390, the lithium cobalt oxides and a lithium compound are just mixed, and the art does not include a concept in which a coating layer composed of a lithium compound is formed.

As described above, in some known art, a coating layer is formed on the positive electrode active material. However, significantly improving the high temperature property of the lithium nickel oxide, which is a drawback of the lithium nickel oxide, without decreasing the conductivity of lithium ions due to the formation of the coating layer is very difficult and has not been achieved yet.

SUMMARY OF THE INVENTION

In view of the above problems, it is an object of the present invention to provide a positive electrode active material composed of lithium nickel oxide, the positive electrode active material having both superior conductivity of lithium ions and the superior high temperature property. Furthermore, it is an object of the present invention to provide a non-aqueous electrolyte secondary battery having a superior property at a high temperature by using this positive electrode active material.

The inventors of the present invention conducted investigations for a long time to achieve the above object. As a result, in a positive electrode active material including particles of lithium compound oxide and a coating layer formed on the surfaces of the particles, the particles and the coating layer are composed of lithium compound oxides having a specific element. The positive electrode active material can suppress the decomposition of the electrolyte and can also suppress the decrease of the conductivity of lithium ions due to the formation of the coating layer. The present invention is achieved based on this intensive study.

The positive electrode active material of the present invention includes particles having a layered structure, the particles composed of a first compound oxide of lithium and nickel (Ni); and coating layers formed on at least parts of the surfaces of the particles, the coating layers composed of a second compound oxide of lithium and titanium.

According to the above positive electrode active material, the first compound oxide composed of lithium and nickel is coated with the second compound oxide composed of lithium and titanium. This structure suppresses the direct contact between the first compound oxide and the electrolyte and prevents, for example, the decomposition of the electrolyte by the first compound oxide. Consequently, the use of this positive electrode active material improves the high temperature property of the non-aqueous electrolyte secondary battery. The positive electrode active material of the present invention has a superior adherence of the coating layer, compared with a positive electrode active material having a known coating layer. This is based on the interaction between nickel in the first compound oxide in the particle, and lithium and titanium in the second compound oxide in the coating layer. Since the coating layer includes the second compound oxide containing lithium, lithium ions are readily diffused in the coating layer. Accordingly, the conductivity of the lithium ions between the particles composed of the first compound oxide and the electrolyte is not decreased.

According to a non-aqueous electrolyte secondary battery of the present invention, the non-aqueous electrolyte secondary battery includes a positive electrode active material and a negative electrode active material. The positive electrode active material includes particles having a layered structure, the particles composed of a first compound oxide of lithium and nickel; and coating layers formed on at least parts of the surfaces of the particles, the coating layers composed of a second compound oxide of lithium and titanium. The above non-aqueous electrolyte secondary battery has a superior high temperature property due to the function of the positive electrode active material.

The present invention provides a positive electrode active material having both superior conductivity of lithium ions and the superior high temperature property in a non-aqueous electrolyte secondary battery, while the positive electrode active material is mainly composed of lithium nickel oxide. The present invention also provides a non-aqueous electrolyte secondary battery having both superior conductivity of lithium ions and the high temperature property by using the above positive electrode active material.

DESCRIPTION OF THE PREFERRED EMBODIMENTS

Figure 1:
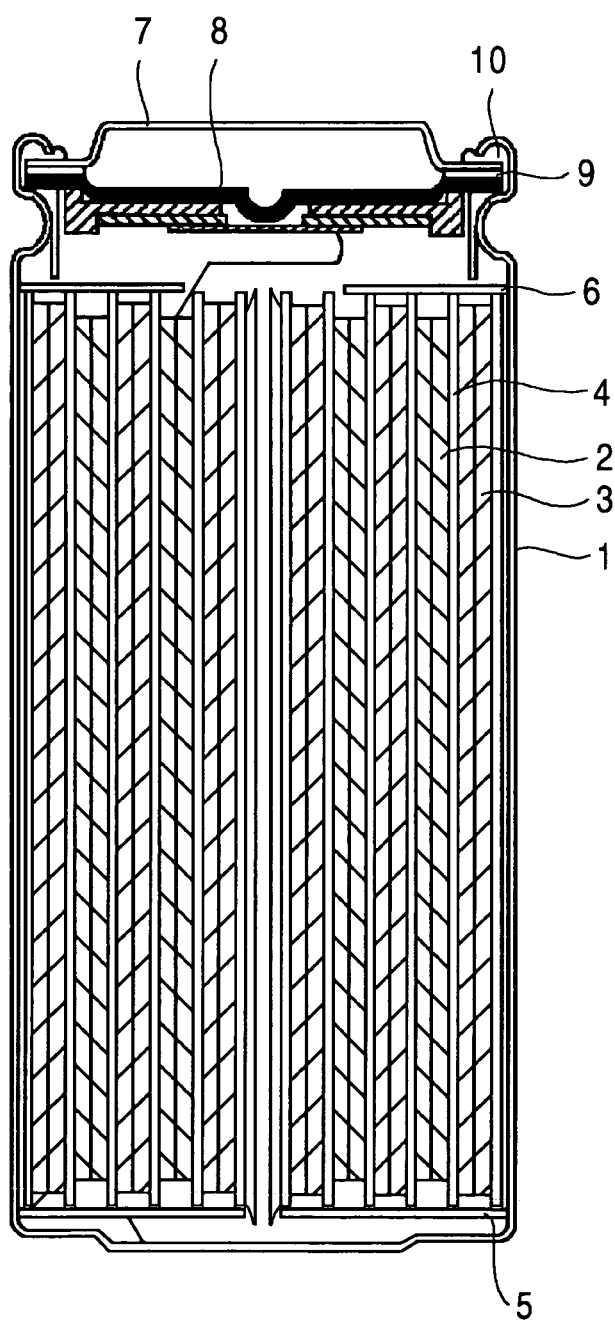
FIG. 1 is a longitudinal section showing an example of a non-aqueous electrolyte secondary battery of the present invention.

A positive electrode active material and a non-aqueous electrolyte secondary battery containing the positive electrode active material of the present invention will now be described in detail.

The positive electrode active material of the present invention includes particles having a layered structure, the particles composed of a first compound oxide of lithium and nickel; and coating layers formed on at least parts of the surfaces of the particles, the coating layer composed of a second compound oxide of lithium and titanium.

The first compound oxide is a compound oxide having a layered structure, mainly composed of lithium and nickel, and capable of doping and undoping of lithium. Example of the first compound oxide includes a compound oxide of lithium and a transition metal such as $LiNi_{(1-x)}M_xO_2$, wherein x is represented by $0.5 \geq x > 0.1$, and element M is at least one element selected from the group consisting of iron (Fe), cobalt (Co), manganese (Mn), copper (Cu), zinc (Zn), chromium (Cr), vanadium (V), titanium (Ti), aluminum (Al), tin (Sn), boron (B), gallium (Ga), magnesium (Mg), calcium (Ca), and strontium (Sr). For example, the first compound oxide includes $LiNi_{0.70}Mn_{0.30}O_2$ and $LiNi_{0.70}Co_{0.30}O_2$. Furthermore, the first compound oxide may be a known material in which the element is partly replaced with another element. The first compound oxide must include nickel because the second compound oxide mainly composed of lithium and titanium is strongly adhered, that is, the coating layer is strongly adhered to the first compound oxide. If the first compound oxide does not include nickel, the second compound oxide is insufficiently adhered on the surfaces of the particles composed of the first compound oxide. Therefore, the first compound oxide without nickel cannot improve the cycle durability.

The second compound oxide is mainly composed of lithium and titanium. Examples of the second compound oxide include a lithium compound oxide such as $Li_4Ti_5O_{12}$, $Li_2TiO_3$, and $Li_2Ti_3O_7$. The second compound oxide may have a cubic system, a monoclinic system, or a rhombic system. In particular, the second compound oxide preferably has a spinel structure in the cubic system. Furthermore, the second compound oxide may be a known material such as $Li_4Ti_{4.90}Mn_{0.10}O_{12}$, in which the element is partly replaced with another element. If the second compound oxide does not include lithium, the conductivity of lithium ions in the coating layer is significantly decreased, that is, the conductivity of lithium ions of the positive electrode active material is decreased. Consequently, the capacity and the cycle durability are decreased in the non-aqueous electrolyte secondary battery having the second compound oxide. Although the coating layers may be formed on at least parts of the surfaces of the particles, the coating layers are preferably formed on the entire surfaces of the particles in order to reliably improve the high temperature property.

The ratio by weight of the first compound oxide to the second compound oxide in the positive electrode active material is preferably in the range of 96:4 to 65:35. This range of the ratio can improve the cycle durability without decreasing the capacity of the non-aqueous electrolyte secondary battery containing the positive electrode active material. When the ratio of the second compound oxide is smaller than the above range, the cycle durability is insufficiently improved. On the other hand, when the ratio of the second compound oxide is larger than the above range, the excessive amount of the coating layer in the positive electrode active material causes disadvantages such as the degradation of the characteristics.

The positive electrode active material including the particles composed of the first compound oxide and the coating layer composed of the second compound oxide preferably has a mean particle diameter (median size) of 5 to 20 μm. This mean particle diameter provides the positive electrode active material with a totally adequate specific surface area and superior properties in the non-aqueous electrolyte secondary battery. When the mean particle diameter of the positive electrode active material is less than 5 μm, the reactivity with an electrolytic solution is increased because the specific surface area is too large. When the mean particle diameter of the positive electrode active material exceeds 20 μm, the moving resistance of the lithium ions is increased between the electrolyte and the positive electrode active material because the specific surface area is too small. In the above both cases, the property of the battery is decreased.

The method for preparing the first compound oxide is not limited. For example, carbonates such as lithium carbonate and nickel carbonate are mixed according to the composition, and the mixture is then sintered at 600° C. to 1,100° C. in air or in oxygen. Alternatively, a lithium source such as lithium hydroxide is mixed with a compound hydroxide prepared by coprecipitating an aqueous solution of inorganic salt mainly composed of nickel, and the mixture is sintered in air or in oxygen. Furthermore, as long as the above property is achieved, any other methods such as a solid-phase synthesis and a hydrothermal synthesis may be employed. Examples of the starting material include compound carbonates, organic salts, and oxides.

The above second compound oxide can be prepared by, for example, a dry synthesis and a hydrothermal synthesis as disclosed in PCT Publication No. WO99/03784 and other known methods. Various lithium compounds and titanium compounds may be used as the starting material.

The method for coating on the surfaces of the particles composed of the first compound oxide with the second compound oxide to form the coating layer is not limited as long as the adhesion can be achieved in the above ratio by weight. For example, the first compound oxide and the second compound oxide are mixed, or the precursor of the first compound oxide and the precursor of the second compound oxide are mixed, and then the mixture is heated to coat the second compound oxide on the surfaces of the particles of the first compound oxide. In another method, particles of the second compound oxide are compressed on the surfaces of the particles of the first compound oxide by applying a mechanical stress to both of the particles in order to physically coat the second compound oxide. Alternatively, the second compound oxide is precipitated on the particles of the first compound oxide using a wet process represented by a sol-gel process, and the resultant material is heated.

According to the above positive electrode active material, the surfaces of the first compound oxide particles composed of lithium and nickel is coated with the coating layer of the second compound oxide mainly composed of lithium and titanium. Accordingly, the contact of the first compound oxide and the electrolyte can be prevented in the non-aqueous electrolyte secondary battery containing the positive electrode active material. For example, the decomposition of the electrolyte by the first compound oxide mainly composed of lithium and nickel can be suppressed, therefore, the cycle durability and the environmental resistance, in particular, the high temperature property of the battery can be significantly improved. In addition, since the coating layer includes the second compound oxide mainly composed of lithium, the transfer of the lithium ions is not prevented between the first compound oxide in the particles and the electrolyte. This positive electrode active material can suppress the decrease of the conductivity of the lithium ions due to the formation of the coating layer. In particular, according to this positive electrode active material, since each of the particles and the coating layer are composed of a specific element, that is, lithium nickel oxide is used for the first compound oxide and lithium titanium oxide is used for the second compound oxide, the particles of the first compound oxide can be reliably coated with the second compound oxide. Therefore, the cycle durability of the non-aqueous electrolyte secondary battery can be significantly improved compared with a non-aqueous electrolyte secondary battery including a positive electrode active material having the known coating layer.

An example of the non-aqueous electrolyte secondary battery having the above positive electrode active material will now be described with reference to FIG. 1.

A non-aqueous electrolyte secondary battery shown in FIG. 1 is a cylindrical type and includes a wound electrode body in a hollow cylindrical battery can 1. In the wound electrode body, a band-shaped positive electrode 2 having a positive electrode active material and a band-shaped negative electrode 3 having a negative electrode active material are wound multiple times, and separators 4 having ion permeability are interposed therebetween. The battery can 1 is composed of, for example, iron coated with nickel plating.

One end of the battery can 1 is closed and the other end is open. A pair of insulating plates 5 and 6 is disposed in the battery can 1 so that the insulating plates 5 and 6 sandwich both ends of the wound electrode body.

At the open end of the battery can 1, a battery lid 7, a safety valve 8 disposed inside of the battery lid 7, and a positive temperature coefficient (hereinafter referred to as PTC) element 9 are attached by caulking with a sealing gasket 10 and the interior of the battery can 1 is sealed. For example, the battery lid 7 and the battery can 1 are composed of the same material. The safety valve 8 and the battery lid 7 are electrically connected with the PCT element 9 disposed therebetween. The safety valve 8 includes a current breaker. Accordingly, when the internal pressure of the battery exceeds a certain value because of, for example, an internal short or an external heating, the electrical connection between the battery lid 7 and the wound electrode body is broken. When the temperature is increased, the PTC element 9 increases the resistance to limit the current, thus preventing the abnormal heat due to a heavy current. The sealing gasket 10 is composed of, for example, an insulating material and has an asphalt coating thereon.

The positive electrode 2 includes, for example, a positive electrode active material layer having a positive electrode active material, and a positive electrode collector. The positive electrode collector is composed of, for example, a metal foil such as aluminum foil. The positive electrode active material layer includes, for example, the positive electrode active material, a conductive material such as graphite, and a binder such as polyvinylidene fluoride. The positive electrode active material used in the present embodiment includes, as described above, particles having a layered structure, the particles composed of the first compound oxide of lithium and nickel; and coating layers formed on at least parts of the surfaces of the particles, composed of the second compound oxide of lithium and titanium.

The negative electrode 3 is composed of, for example, a material capable of electrochemically doping and undoping of lithium by the difference in electrical potential of 2.0 V or less versus lithium metal. Examples of the negative electrode 3 include carbonaceous materials such as nongraphitizing carbon, artificial graphite, natural graphite, pyrolytic carbons, coke (for example, pitch coke, needle coke, and petroleum coke), graphites, glassy carbons, sintered organic polymers (for example, carbonized material produced by sintering phenol resin or furan resin at an adequate temperature), carbon fiber, activated carbon, and carbon blacks. In addition, a metal that can form an alloy with lithium, its alloy, and its intermetallic compound can be also used. Examples of the negative electrode 3 also include compounds capable of doping and undoping of lithium at a relatively low electrical potential, for example, oxides such as iron oxide, ruthenium oxide, molybdenum oxide, tungsten oxide, titanium oxide, and tin oxide; and nitrides. Furthermore, lithium metal and lithium alloys can be also used as the negative electrode 3.

Examples of the electrolyte include a non-aqueous electrolyte produced by dissolving an electrolyte salt in a non-aqueous solvent, a solid electrolyte including an electrolyte salt, and a gel electrolyte produced by impregnating an organic polymer with a non-aqueous solvent and an electrolyte salt.

The non-aqueous electrolyte is prepared using an organic solvent and an electrolyte in appropriate combination. Any organic solvents that are used for this kind of battery can be used. Examples of the organic solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetates, butyrates, and propionates.

The solid electrolyte, which has a conductivity of lithium ions, includes an inorganic solid electrolyte and a solid polymer electrolyte. Examples of the inorganic solid electrolyte include lithium nitride and lithium iodide. The solid polymer electrolyte includes an electrolyte salt and a polymer that dissolves the electrolyte salt. Examples of the polymer include polyethers such as poly(ethylene oxide) and its crosslinked polymers, poly(methacrylates), and poly(acrylates). These polymers can be used alone, by copolymerization, or by mixing. The solid polymer electrolyte may be a gel electrolyte that includes a plasticizer (solvent), or a complete solid electrolyte that does not include a plasticizer.

A matrix polymer in the gel electrolyte is subjected to gelation by absorbing the non-aqueous electrolyte. Various polymers can be used for the matrix polymer. Examples of the matrix polymer include fluorocarbon polymers such as poly(vinylidene fluoride) and poly(vinylidene fluoride-co-hexafluoropropylene); polyethers such as poly(ethylene oxide) and its crosslinked polymers; and poly(acrylonitrile). In view of the stability of redox reaction, fluorocarbon polymers are preferably used. An electrolyte salt in the matrix polymer provides the ion conductivity.

Any electrolyte salts that are used for this kind of battery can be used in the above electrolyte. Examples of the electrolyte salts include $LiClO_4$, $LiAsF_6$, $LiPF_6$, $LiBF_4$, $LiB(C_6H_5)_4$, $CH_3SO_3Li$, $CF_3SO_3Li$, $LiCl$, and $LiBr$.

The shape of the battery according to the present invention is not limited and includes a cylindrical type, a square type, a coin type, a button type, and a laminate sealed type.

The methods for producing the above negative electrode and positive electrode include the following method and are not limited. For example, a known binder and a known conductive material are added to the material, a solvent is further added to the mixture, and then the mixture is applied. Other component such as a known binder is added to the material, and the mixture is heated and applied. The material alone or a mixture of the material, a conductive material, and a binder is, for example, formed to prepare a formed electrode. Specifically, the material is mixed with, for example, a binder and an organic solvent to prepare slurry. Then the slurry is applied on the collector and dried. Alternatively, regardless of the presence of the binder, the active material is subjected to pressure forming during heating, thus producing an electrode having a superior strength.

In order to produce the battery, the positive electrode and the negative electrode may be wound around a core and a separator may be disposed between the positive electrode and the negative electrode. Alternatively, the electrodes and separators may be laminated in order (i.e., a laminating method). The method for producing the battery is not limited. For example, the present invention is useful in a method for producing a square type battery in which the positive electrode and the negative electrode are wound.

According to the non-aqueous electrolyte secondary battery described above, the positive electrode 2 includes the positive electrode active material including particles having a layered structure, the particles composed of a first compound oxide of lithium and nickel; and coating layers formed on the surfaces of the particles, the coating layers composed of a second compound oxide of lithium and titanium. Accordingly, for example, the decomposition of the electrolyte by the first compound oxide can be suppressed. Therefore, the cycle durability, in particular, the high temperature property of the battery can be significantly improved. Furthermore, the second compound oxide includes lithium. Consequently, a sufficient conductivity of lithium ions can be achieved while the contact between the first compound oxide and the electrolyte is prevented.

EXAMPLES

Examples according to the present invention will now be described based on experimental results.

Sample 1

(Synthesis of First Compound Oxide)

Commercially available nickel nitrate and manganese nitrate were mixed so that an aqueous solution had the ratio of Ni:Mn=0.70:0.30. Ammonia water was added dropwise with sufficient stirring to prepare a compound hydroxide. The compound hydroxide was mixed with lithium hydroxide. The mixture was sintered at 850° C. for 10 hours in oxygen flow and then crushed to prepare lithium nickel manganese oxide. According to atomic absorption spectrophotometry, the resultant powder had a composition of $LiNi_{0.70}Mn_{0.30}O_2$. According to laser diffractometry, the powder had a mean particle diameter of 13 μm. According to X-ray diffractometry, the diffraction pattern was similar to the $LiNiO_2$ pattern in International Center for Diffraction Data (ICDD) 09-0063, that is, the pattern showed that the powder had a layered rock-salt structure similar to $LiNiO_2$. According to the observation by a scanning electron microscope (hereinafter referred to as SEM), the powder had a spherical shape formed by aggregation of primary particles having a diameter of 0.1 to 5 μm. This powder was used as a first compound oxide.

(Synthesis of Second Compound Oxide)

Commercially available titanium oxide (anatase) and lithium hydroxide were mixed so that the mixture had the ratio of Li:Ti=4:5. The mixture was sintered at 800° C. for 10 hours and then crushed to prepare lithium titanium oxide. According to laser diffractometry, the powder had a mean particle diameter of 0.4 μm. According to the X-ray diffractometry, the diffraction pattern of the powder corresponded to a pattern in ICDD 26-1198, which represents the $Li_4Ti_5O_{12}$ having a spinel structure in the cubic system. This powder was used as a second compound oxide.

Figure 2A:
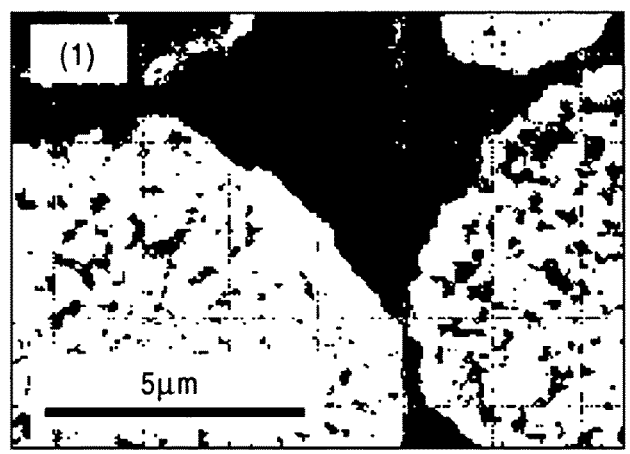
FIG. 2A is a secondary electron image by an SEM showing a positive electrode active material in Sample 1.
Figure 2B:
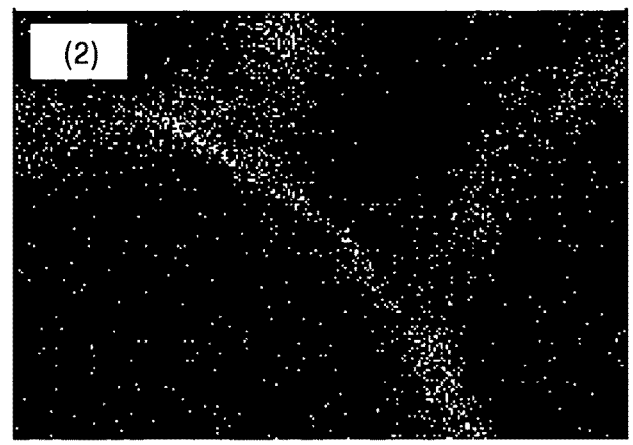
FIG. 2B shows an element mapping of titanium of the positive electrode active material in Sample 1.
Figure 2C:
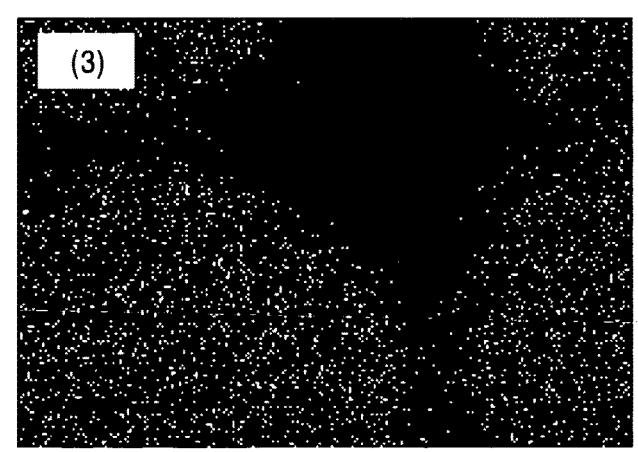
FIG. 2C shows an element mapping of nickel in the positive electrode active material in Sample 1.

The first compound oxide and the second compound oxide were mixed in the ratio of 90:10 by weight. The powder mixture was processed with a Mechanofusion apparatus (AMS-LAB, Hosokawa Micron Corporation) to prepare composite particles, in other words, to coat the second compound oxide on the surfaces of the first compound oxide. This apparatus includes a rotatable cylindrical vessel and fixed bars having a semicircular pillar shape, the bars disposed along the inside wall of the vessel and parallel to the rotation axis. The powder mixture is pressed on the inside wall of the vessel by a centrifugal force. The pressed powder mixture is passed through a clearance between the fixed bars and the inside wall of the vessel. Thus, compressive stress and shear stress are applied to the powder. One kind of particles is pressed and is coated on the surfaces of another kind of particles. In the present embodiment, the clearance was 5 mm, and the linear velocity to pass through the clearance was 20 m/minute. Under this condition, the second compound oxide was coated on the surfaces of the first compound oxide. According to laser diffractometry, the resultant powder had a mean particle diameter of 14 μm. The surface and the cross section of the particles were observed with the SEM. FIGS. 2A, 2B, and 2C show the results. FIG. 2A is a secondary electron image of the particles, FIG. 2B shows an element mapping of titanium, and FIG. 2C shows an element mapping of nickel. FIGS. 2A, 2B, and 2C showed that the spherical shaped particles of the first compound oxide mainly composed of nickel had a layer of the second compound oxide mainly composed of titanium and having the thickness of 1 to 2 μm. This powder was used as the positive electrode active material.

A cylindrical battery was produced using the above positive electrode active material to evaluate the cycle durability at a high temperature.

The positive electrode active material (86% by weight), graphite, i.e., a conductive material (10% by weight), and polyvinylidene fluoride (hereinafter referred to as PVdF), i.e., a binder (4% by weight) were mixed. The mixture was dispersed in N-methyl-2-pyrrolidone (hereinafter referred to as NMP) to prepare a positive electrode mixed slurry. The slurry was uniformly applied on both sides of a band-shaped aluminum foil having a thickness of 20 μm, and was then dried. Subsequently, the foil was compressed with a roller press to prepare a band-shaped positive electrode.

In order to prepare a negative electrode, powdery artificial graphite (90% by weight) and PVdF (10% by weight) were mixed. The mixture was dispersed in NMP to prepare a negative electrode mixed slurry. The slurry was uniformly applied on both sides of a copper foil having a thickness of 10 μm, and was then dried. Subsequently, the foil was compressed with a roller press to prepare a band-shaped negative electrode.

The above band-shaped positive electrode and the above band-shaped negative electrode were wound multiple times, and a separator composed of a porous polyolefin film was disposed between the positive electrode and the negative electrode to prepare a wound electrode body. The wound electrode body was put in an iron battery can covered with nickel plating. Insulating plates were disposed at both upper and lower sides of the electrode body. Subsequently, a positive electrode lead composed of aluminum was led from a positive electrode collector. The positive electrode lead was welded with a projecting portion of a safety valve that was electrically connected with a battery lid. Furthermore, a negative electrode lead composed of nickel was led from a negative electrode collector, and the negative electrode lead was welded with a bottom portion of the battery can.

In order to prepare a non-aqueous electrolyte, ethylene carbonate and methyl ethyl carbonate were mixed so that the mixed solution had a ratio of 1:1 by volume. $LiPF_6$ was further dissolved in the mixed solution so that the concentration of the $LiPF_6$ was 1 mol/dm$^3$.

Subsequently, the non-aqueous electrolyte was filled in the battery can having the above electrode body. Finally, the battery can was caulked with an insulating sealing gasket, thereby fixing the safety valve, a PTC element, and the battery lid. Thus, a cylindrical battery (18 mm in outer diameter and 65 mm in perpendicular length) was produced.

In order to measure the initial capacity of the above non-aqueous electrolyte secondary battery, the battery was charged and discharged at the following conditions: The battery was charged at 45° C. for 2.5 hours, at the charging voltage of 4.20 V, at the charging current of 1 A. Subsequently, the battery was discharged at the discharge current of 2 A, and at the final voltage was 2.75 V. Then the initial capacity was measured. Furthermore, the charge and discharge were repeated under the same conditions as in the measurement of the initial capacity. The discharge capacity at the 100th cycle was measured to calculate a residual capacity, i.e., the residual percentage of the capacity relative to the initial capacity.

Sample 2

Sample 2 was produced as in Sample 1, but in the preparation of the second compound oxide, the mixing ratio of the starting material and the sintering temperature were changed to synthesize $Li_2TiO_3$ having a monoclinic system. Commercially available titanium oxide (anatase) and lithium hydroxide were mixed so that the mixture had the ratio of Li:Ti=2:1. The mixture was sintered at 950° C. for 12 hours in oxygen flow and then crushed to prepare lithium titanium oxide. According to laser diffractometry, the powder had a mean particle diameter of 0.6 µm. According to the X-ray diffractometry, the diffraction pattern of the powder corresponded to a pattern in ICDD 71-2348, which represents the $Li_2TiO_3$ having the monoclinic system. Subsequently, a non-aqueous electrolyte secondary battery was produced as in Sample 1. The residual capacity was measured at 45° C. as in Sample 1.

Sample 3

Sample 3 was produced as in Sample 1, but in the preparation of the second compound oxide, the mixing ratio of the starting material and the sintering temperature were changed to synthesize $Li_2Ti_3O_7$ having a rhombic system. Commercially available titanium oxide (anatase) and lithium hydroxide were mixed so that the mixture had the ratio of Li:Ti=2:3. The mixture was sintered at 1,100° C. for 20 hours in oxygen flow and then crushed to prepare lithium titanium oxide. According to laser diffractometry, the powder had a mean particle diameter of 0.8 µm. According to the X-ray diffractometry, the diffraction pattern of the powder corresponded to a pattern of $Li_2Ti_3O_7$ disclosed in, for example, Journal of Materials Science, 37 (2002) 3,981. Subsequently, a non-aqueous electrolyte secondary battery was produced as in Sample 1. The residual capacity was measured at 45° C. as in Sample 1.

Sample 4

Sample 4 was produced as in Sample 1, but in the preparation of the second compound oxide, an oxide containing titanium and manganese as solid solution was used as the starting material to synthesize $Li_4Ti_{4.90}Mn_{0.10}O_{12}$ having the spinel structure in the cubic system. Commercially available titanium oxide (anatase), lithium hydroxide, and manganese oxide were mixed so that the mixture had the ratio of Li:Ti:Mn=4:4.9:0.1. The mixture was sintered at 800° C. for 10 hours in oxygen flow and then crushed to prepare lithium titanium manganese oxide. According to laser diffractometry, the powder had a mean particle diameter of 0.3 µm. Subsequently, a non-aqueous electrolyte secondary battery was produced as in Sample 1. The residual capacity was measured at 45° C. as in Sample 1.

Sample 5

Sample 5 was produced as in Sample 1, but in the preparation of the first compound oxide, cobalt nitrate was used as the starting material instead of manganese nitrate, and the mixing ratio of the starting material and the sintering temperature were changed to synthesize $LiNi_{0.70}Co_{0.30}O_2$. Commercially available nickel nitrate and cobalt nitrate were mixed so that an aqueous solution had the ratio of Ni:Co=0.70:0.30. Ammonia water was added dropwise with sufficient stirring to prepare a compound hydroxide. The compound hydroxide was mixed with lithium hydroxide. The mixture was sintered at 800° C. for 10 hours in oxygen flow and then crushed to prepare lithium nickel cobalt oxide. According to atomic absorption spectrophotometry, the resultant powder had a composition of $LiNi_{0.70}Co_{0.30}O_2$. According to laser diffractometry, the powder had a mean particle diameter of 14 µm. According to X-ray diffractometry, the diffraction pattern was similar to the $LiNiO_2$ pattern in ICDD 09-0063; therefore, the powder had a layered rock-salt structure similar to $LiNiO_2$. Subsequently, a non-aqueous electrolyte secondary battery was produced as in Sample 1. The residual capacity was measured at 45° C. as in Sample 1.

Sample 6

Sample 6 was produced as in Sample 1, but in the preparation of the first compound oxide, cobalt nitrate was further added to the starting material, and the mixing ratio of the starting material and the sintering temperature were changed to synthesize $LiNi_{0.50}Co_{0.20}Mn_{0.30}O_2$. Commercially available nickel nitrate, cobalt nitrate, and manganese nitrate were mixed so that an aqueous solution had the ratio of Ni:Co:Mn=0.50:0.20:0.30. Ammonia water was added dropwise with sufficient stirring to prepare a compound hydroxide. The compound hydroxide was mixed with lithium hydroxide. The mixture was sintered at 850° C. for 10 hours in oxygen flow and then crushed to prepare lithium nickel cobalt manganese oxide. According to atomic absorption spectrophotometry, the resultant powder had a composition of $LiNi_{0.50}Co_{0.20}Mn_{0.30}O_2$. According to laser diffractometry, the powder had a mean particle diameter of 14 µm. According to X-ray diffractometry, the diffraction pattern was similar to the $LiNiO_2$ pattern in ICDD 09-0063, that is, the pattern showed that the powder had a layered rock-salt structure similar to $LiNiO_2$. Subsequently, a non-aqueous electrolyte secondary battery was produced as in sample 1. The residual capacity was measured at 45° C. as in Sample 1.

Sample 7

Figure 3A:
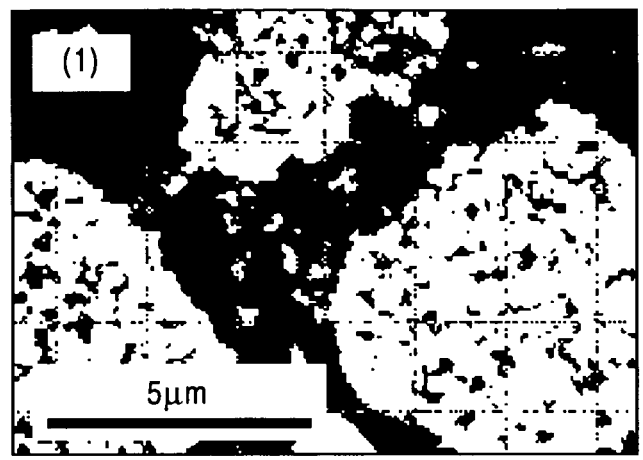
FIG. 3A is a secondary electron image by the SEM showing a positive electrode active material in Sample 7.
Figure 3B:
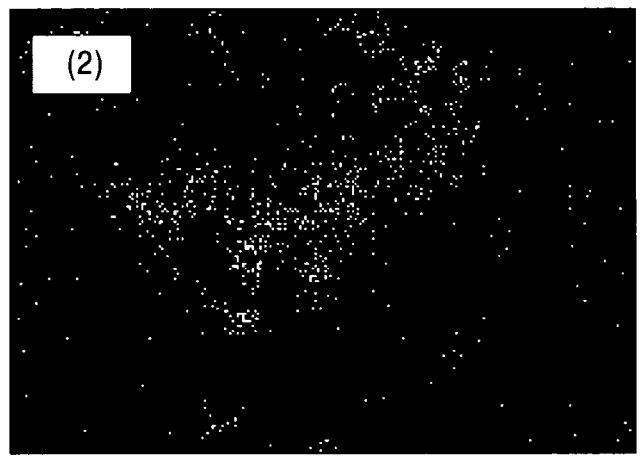
FIG. 3B shows an element mapping of titanium in the positive electrode active material in Sample 7.
Figure 3C:
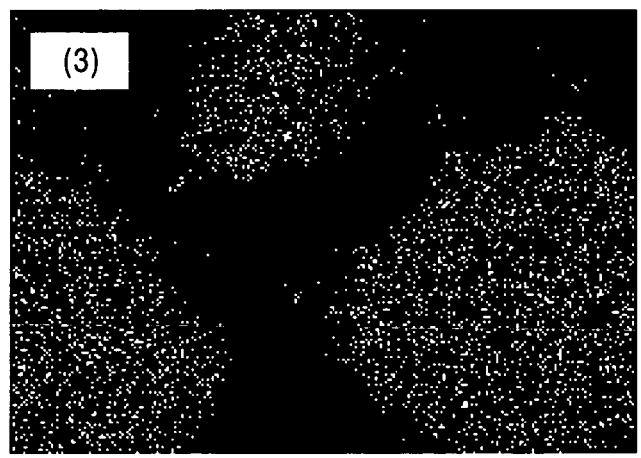
FIG. 3C shows an element mapping of nickel in the positive electrode active material in Sample 7.

Sample 7 was produced as in Sample 1, but the first compound oxide and the second compound oxide were not subjected to the coating process, but were just mixed. The surface and the cross section of the particle mixture were observed with the SEM. FIGS. 3A, 3B, and 3C show the results. FIG. 3A is a secondary electron image of the particle mixture, FIG. 3B shows an element mapping of titanium, and FIG. 3C shows an element mapping of nickel. Unlike Sample 1, FIGS. 3A, 3B, and 3C showed that two kinds of particles were independently dispersed. The mixture was used as the positive electrode active material. Subsequently, a non-aqueous electrolyte secondary battery was produced as in Sample 1. The residual capacity was measured at 45° C. as in Sample 1.

Sample 8

Sample 8 was produced as in Sample 1, but the first compound oxide was coated with titanium oxide ($TiO_2$) instead of the second compound oxide. The coated particles were used as the positive electrode active material. Subsequently, a non-aqueous electrolyte secondary battery was produced as in sample 1. The residual capacity was measured at 45° C. as in Sample 1.

Sample 9

Sample 9 was produced as in Sample 1, but in the preparation of the first compound oxide, cobalt nitrate was used as the starting material instead of nickel nitrate, and the mixing ratio of the starting material and the sintering temperature were changed to synthesize $LiCo_{0.70}Mn_{0.30}O_2$. Subsequently, a non-aqueous electrolyte secondary battery was produced as in Sample 1. The residual capacity was measured at 45° C. as in Sample 1.

Table 1 shows the results of the residual capacity in Sample 1 to Sample 9.

TABLE 1

|  | First compound oxide | Second compound oxide | Residual capacity [%] |
|---|---|---|---|
| Sample 1 | $LiNi_{0.70}Mn_{0.30}O_2$ | $Li_4Ti_5O_{12}$ | 93.1 |
| Sample 2 | $LiNi_{0.70}Mn_{0.30}O_2$ | $Li_2TiO_3$ | 85.8 |
| Sample 3 | $LiNi_{0.70}Mn_{0.30}O_2$ | $Li_2Ti_3O_7$ | 86.1 |
| Sample 4 | $LiNi_{0.70}Mn_{0.30}O_2$ | $Li_4Ti_{4.90}Mn_{0.10}O_{12}$ | 92.7 |
| Sample 5 | $LiNi_{0.70}Co_{0.30}O_2$ | $Li_4Ti_5O_{12}$ | 91.1 |
| Sample 6 | $LiNi_{0.50}Co_{0.20}Mn_{0.30}O_2$ | $Li_4Ti_5O_{12}$ | 94.3 |
| Sample 7 | $LiNi_{0.70}Mn_{0.30}O_2$ | $Li_4Ti_5O_{12}$ (just mixed) | 70.4 |
| Sample 8 | $LiNi_{0.70}Mn_{0.30}O_2$ | $TiO_2$ | 68.0 |
| Sample 9 | $LiCo_{0.70}Mn_{0.30}O_2$ | $Li_4Ti_5O_{12}$ | 72.5 |

Referring to Table 1, Samples 1 to 6 had superior residual capacities exceeding 85%. On the other hand, the residual capacities of Samples 7 to 9 that were comparative examples were about 70%. According to the above results, when the particles of lithium nickel oxides were coated with the compound oxide of lithium and titanium, the characteristic in high temperature operation was significantly improved. In the above process, the particles of lithium compound oxide having a layered structure, the particles composed of lithium and nickel were coated with the compound oxide of lithium and titanium to prepare the composite particles. Furthermore, the residual capacities of Sample 1, Sample 4, Sample 5, and Sample 6 were particularly high and 91.1% or more. Accordingly, the result showed that the second compound oxide was preferably a compound oxide mainly composed of lithium and titanium and having a spinel structure in the cubic system. Referring to Sample 7, the residual capacity barely improved. This result showed that the surfaces of the lithium nickel oxide must be coated with lithium titanium oxide by the coating process, instead of just mixing the two kinds of compound oxides.

The appropriate ratio of the first compound oxide to the second compound oxide was investigated.

Sample 10

Sample 10 was produced as in Sample 1, but the first compound oxide and the second compound oxide were mixed in the ratio of 80:20 by weight. And then the second compound oxide was coated on the surfaces of the first compound oxide. According to the observation by the SEM, the particles of the first compound oxide were covered with the particles of the second compound oxide having the thickness of 1 to 2 μm. Subsequently, a non-aqueous electrolyte secondary battery was produced as in Sample 1. The residual capacity was measured at 45° C. as in Sample 1.

Sample 11

Sample 11 was produced as in Sample 1, but the first compound oxide and the second compound oxide were mixed in the ratio of 70:30 by weight. And then the second compound oxide was coated on the surfaces of the first compound oxide. According to the observation by the SEM, the particles of the first compound oxide were covered with the particles of the second compound oxide having the thickness of 1 to 3 μm. Subsequently, a non-aqueous electrolyte secondary battery was produced as in Sample 1. The residual capacity was measured at 45° C. as in Sample 1.

Sample 12

Sample 12 was produced as in Sample 1, but the first compound oxide and the second compound oxide were mixed in the ratio of 65:35 by weight. And then the second compound oxide was coated on the surfaces of the first compound oxide. According to the observation by the SEM, the particles of the first compound oxide were covered with the particles of the second compound oxide having the thickness of 1 to 3 μm. Subsequently, a non-aqueous electrolyte secondary battery was produced as in Sample 1. The residual capacity was measured at 45° C. as in Sample 1.

Sample 13

Sample 13 was produced as in Sample 1, but the first compound oxide and the second compound oxide were mixed in the ratio of 95:5 by weight. And then the second compound oxide was coated on the surfaces of the first compound oxide. According to the observation by the SEM, the particles of the first compound oxide were covered with the particles of the second compound oxide having the thickness of 0.5 to 1 μm. Subsequently, a non-aqueous electrolyte secondary battery was produced as in Sample 1. The residual capacity was measured at 45° C. as in Sample 1.

Sample 14

Sample 14 was produced as in Sample 1, but the first compound oxide and the second compound oxide were mixed in the ratio of 97:3 by weight. And then the second compound oxide was coated on the surfaces of the first compound oxide. According to the observation by the SEM, the surfaces of the particles of the first compound oxide were partly covered with the particles of the second compound oxide. Subsequently, a non-aqueous electrolyte secondary battery was produced as in Sample 1. The residual capacity was measured at 45° C. as in Sample 1.

Sample 15

Sample 15 was produced as in Sample 1, but the first compound oxide and the second compound oxide were mixed in the ratio of 60:40 by weight. And then the second compound oxide was coated on the surfaces of the first compound oxide. According to the observation by the SEM, the particles of the first compound oxide were covered with the particles of the second compound oxide having the thickness of 2 to 3 μm. Subsequently, a non-aqueous electrolyte secondary battery was produced as in Sample 1. The residual capacity was measured at 45° C. as in Sample 1.

Table 2 shows the results of the residual capacity in Sample 10 to Sample 15 in addition to Sample 1.

TABLE 2

|  | Mixing ratio (A:B) | Residual capacity [%] |
|---|---|---|
| Sample 1 | 90:10 | 93.1 |
| Sample 10 | 80:20 | 90.4 |
| Sample 11 | 70:30 | 86.6 |
| Sample 12 | 65:35 | 82.9 |
| Sample 13 | 95:5 | 85.5 |
| Sample 14 | 97:3 | 74.3 |
| Sample 15 | 60:40 | 72.5 |

The above experimental results showed that in the coating process of the second compound oxide on the surfaces of the first compound oxide, the ratio of the first compound oxide to the second compound oxide was preferably between 96:4 and 65:35, in particular, between 95:5 and 65:35.

The appropriate mean particle diameter of the positive electrode active material was investigated.

Sample 16

As in Sample 1, commercially available nickel nitrate and manganese nitrate were mixed so that an aqueous solution had the ratio of Ni:Mn=0.70:0.30. Ammonia water was added dropwise with sufficient stirring to prepare a compound hydroxide. The stirring time was extended such that the compound hydroxide had the mean particle diameter of 20 μm. The compound hydroxide was mixed with lithium hydroxide. The mixture was sintered at 850° C. for 10 hours in oxygen flow and then crushed to prepare lithium nickel manganese oxide. According to atomic absorption spectrophotometry, the resultant powder had a composition of $LiNi_{0.70}Mn_{0.30}O_2$. According to laser diffractometry, the powder had a mean particle diameter of 18 μm. According to X-ray diffractometry, the diffraction pattern was similar to the $LiNiO_2$ pattern in ICDD 09-0063, that is, the pattern showed that the powder had a layered rock-salt structure similar to $LiNiO_2$. This lithium nickel manganese oxide particles were covered with the second compound oxide as in Sample 1 to prepare the positive electrode active material. The positive electrode active material had a mean particle diameter of 19 μm. Subsequently, a non-aqueous electrolyte secondary battery was produced as in Sample 1. The residual capacity was measured at 45° C. as in Sample 1.

Sample 17

As in Sample 1, commercially available nickel nitrate and manganese nitrate were mixed so that an aqueous solution had the ratio of Ni:Mn=0.70:0.30. Ammonia water was added dropwise with sufficient stirring to prepare a compound hydroxide. The stirring time was shortened such that the compound hydroxide had the mean particle diameter of 8 μm. The compound hydroxide was mixed with lithium hydroxide. The mixture was sintered at 850° C. for 10 hours in oxygen flow and then crushed to prepare lithium nickel manganese oxide. According to atomic absorption spectrophotometry, the resultant powder had a composition of $LiNi_{0.70}Mn_{0.30}O_2$. According to laser diffractometry, the powder had a mean particle diameter of 7 μm. This lithium nickel manganese oxide particles were covered with the second compound oxide as in Sample 1 to prepare the positive electrode active material. The positive electrode active material had a mean particle diameter of 9 μm. Subsequently, a non-aqueous electrolyte secondary battery was produced as in Sample 1. The residual capacity was measured at 45° C. as in Sample 1.

Sample 18

As in Sample 1, commercially available nickel nitrate and manganese nitrate were mixed so that an aqueous solution had the ratio of Ni:Mn=0.70:0.30. Ammonia water was added dropwise with sufficient stirring to prepare a compound hydroxide. The stirring time was shortened such that the compound hydroxide had the mean particle diameter of 6 μm. The compound hydroxide was mixed with lithium hydroxide. The mixture was sintered at 850° C. for 10 hours in oxygen flow and then crushed to prepare lithium nickel manganese oxide. According to atomic absorption spectrophotometry, the resultant powder had a composition of $LiNi_{0.70}Mn_{0.30}O_2$. According to laser diffractometry, the powder had a mean particle diameter of 5 μm. Thus, the first compound oxide having a mean particle diameter of 5 μm was prepared. The particles of the first compound oxide were covered with the second compound oxide as in Sample 1 to prepare the positive electrode active material. The positive electrode active material had a mean particle diameter of 6 μm. Subsequently, a non-aqueous electrolyte secondary battery was produced as in Sample 1. The residual capacity was measured at 45° C. as in Sample 1.

Sample 19

Sample 19 was produced as in Sample 1, but the condition for synthesizing the first compound oxide was changed. Commercially available nickel nitrate and manganese nitrate were mixed so that an aqueous solution had the ratio of Ni:Mn=0.70:0.30. Ammonia water was added dropwise with sufficient stirring to prepare a compound hydroxide. The stirring time was shortened such that the compound hydroxide had the mean particle diameter of 4 μm. The compound hydroxide was mixed with lithium hydroxide. The mixture was sintered at 850° C. for 10 hours in oxygen flow and then crushed to prepare lithium nickel manganese oxide. According to atomic absorption spectrophotometry, the resultant powder had a composition of $LiNi_{0.70}Mn_{0.30}O_2$. According to laser diffractometry, the powder had a mean particle diameter of 3 μm. Thus, the first compound oxide having a mean particle diameter of 3 μm was prepared. The particles of the first compound oxide were covered with the second compound oxide as in Sample 1 to prepare the positive electrode active material. The positive electrode active material had a mean particle diameter of 4 μm. Subsequently, a non-aqueous electrolyte secondary battery was produced as in Sample 1. The residual capacity was measured at 45° C. as in Sample 1.

Sample 20

Sample 20 was produced as in Sample 1, but the condition for synthesizing the first compound oxide was changed. Commercially available nickel nitrate and manganese nitrate were mixed so that an aqueous solution had the ratio of Ni:Mn=0.70:0.30. Ammonia water was added dropwise with sufficient stirring to prepare a compound hydroxide. The stirring time was extended such that the compound hydroxide had the mean particle diameter of 25 μm. The compound hydroxide was mixed with lithium hydroxide. The mixture was sintered at 850° C for 10 hours in oxygen flow and then crushed to prepare lithium nickel manganese oxide. According to atomic absorption spectrophotometry, the resultant powder had a composition of $LiNi_{0.70}Mn_{0.30}O_2$. According to laser diffractometry, the powder had a mean particle diameter of 23 μm. Thus, the first compound oxide having a mean particle diameter of 23 μm was prepared. The particles of the first compound oxide were covered with the second compound oxide as in Sample 1 to prepare the positive electrode active material. The positive electrode active material had a mean particle diameter of 24 μm. Subsequently, a non-aqueous electrolyte secondary battery was produced as in Sample 1. The residual capacity was measured at 45° C. as in Sample 1.

Table 3 shows the results of the residual capacity in Sample 16 to Sample 20 in addition to Sample 1.

TABLE 3

|  | Mean particle diameter of positive electrode active material [μm] | Residual capacity [%] |
| --- | --- | --- |
| Sample 1 | 14 | 93.1 |
| Sample 16 | 19 | 88.2 |
| Sample 17 | 9 | 90.5 |
| Sample 18 | 6 | 84.8 |
| Sample 19 | 4 | 70.1 |
| Sample 20 | 24 | 73.0 |

These results showed that the mean particle diameter of the positive electrode active material was preferably 5 to 20 μm, in particular, 6 to 19 μm.

What is claimed is:

1. A positive electrode active material comprising inner particles having a layered structure and a coating layer formed on at least parts of the surfaces of the inner particles,
    wherein said inner particle is a first compound oxide including a compound expressed by the formula $LiNi_{(1-x)}M_xO_2$, wherein x is represented by 0.5>x>0.1, and element M is at least one of iron (Fe), cobalt (Co), manganese (Mn), copper (Cu), zinc (Zn), chromium (Cr), vanadium (V), titanium (Ti), aluminum (Al), tin (Sn), boron (B), gallium (Ga), magnesium (Mg), calcium (Ca), and strontium (Sr), wherein said coating layer is a second compound oxide comprising lithium and having a spinel structure in the cubic system, wherein the ratio by weight of the first compound oxide to the second compound oxide is between 96:4 and 65:35, and wherein the first compound oxide is $LiNi_{0.50}Co_{0.20}Mn_{0.30}O_2$, and the second compound oxide is $Li_4Ti_5O_{12}$.

2. A positive electrode active material comprising inner particles having a layered structure and a coating layer formed on at least parts of the surfaces of the inner particles, wherein said inner particle is a first compound oxide including a compound expressed by the formula $LiNi_{(1-x)}M_xO_2$, wherein x is represented by $0.5>x>0.1$, and element M is at least one of iron (Fe), cobalt (Co), manganese (Mn), copper (Cu), zinc (Zn), chromium (Cr), vanadium (V), titanium (Ti), aluminum (Al), tin (Sn), boron (B), gallium (Ga), magnesium (Mg), calcium (Ca), and strontium (Sr), wherein said coating layer is a second compound oxide comprising lithium and having a spinel structure in the cubic system, wherein the ratio by weight of the first compound oxide to the second compound oxide is between 96:4 and 65:35, and wherein the first compound oxide is $LiNi_{0.50}Co_{0.20}Mn_{0.30}O_2$ having a layered rock-salt structure, and the second compound oxide is $Li_4Ti_5O_{12}$ having a spinel structure in the cubic system.

3. A positive electrode active material comprising inner particles having a layered structure and a coating layer formed on at least parts of the surfaces of the inner particles, wherein said inner particle is a first compound oxide including a compound expressed by the formula $LiNi_{(1-x)}M_xO_2$, wherein x is represented by $0.5>x>0.1$, and element M is at least one of iron (Fe), cobalt (Co), manganese (Mn), copper (Cu), zinc (Zn), chromium (Cr), vanadium (V), titanium (Ti), aluminum (Al), tin (Sn), boron (B), gallium (Ga), magnesium (Mg), calcium (Ca), and strontium (Sr), wherein said coating layer is a second compound oxide comprising lithium and having a spinel structure in the cubic system, wherein the ratio by weight of the first compound oxide to the second compound oxide is between 96:4 and 65:35, and wherein the first compound oxide has a layered rock-salt structure with spherically shaped particles having a mean particle diameter of 13-14 μm, and the second compound oxide is one of $Li_4Ti_5O_{12}$ having a spinel structure in the cubic system and particles with a mean particle diameter of 0.4 μm, $Li_2TiO_3$ having a monoclinic system and particles with a mean particle diameter of 0.6 μm, and $Li_2Ti_3O_7$ having a rhombic system and particles with a mean particle diameter of 0.8 μm.

* * * * *